United States Patent [19]

Ishida et al.

[11] Patent Number: 4,557,369

[45] Date of Patent: Dec. 10, 1985

[54] MOVING STAIRCASE

[75] Inventors: Matsuhiko Ishida; Masaru Asano; Shigeru Goto, all of Inazawa; Takeshi Sakurai, Tokyo, all of Japan

[73] Assignee: Mitsubishi Denki Kabushiki Kaisha, Tokyo, Japan

[21] Appl. No.: 626,125

[22] Filed: Jun. 29, 1984

[30] Foreign Application Priority Data

Jul. 5, 1983 [JP] Japan ............................... 58-122107

[51] Int. Cl.[4] ......................... B65G 9/12; B65G 17/00

[52] U.S. Cl. ..................................... 198/333; 198/321

[58] Field of Search ............... 198/321, 322, 324, 326, 198/333

[56] References Cited

U.S. PATENT DOCUMENTS 4,326,622 4/1982 Ellzey ............................ 198/333 X

FOREIGN PATENT DOCUMENTS 2719384 11/1978 Fed. Rep. of Germany ...... 198/333
3046203 7/1982 Fed. Rep. of Germany .
1420418 11/1965 France ................................ 198/321

*Primary Examiner*—Joseph E. Valenza
*Assistant Examiner*—Michael Stone
*Attorney, Agent, or Firm*—Wenderoth, Lind & Ponack

[57] ABSTRACT

A moving staircase is disclosed wherein along the circulating path of a number of conventional tread boards thereof which are articulated together in an endless fashion at least one pair of specifically constituted tread boards are disposed between any two conventional tread boards so as to be articulated thereto. The specifically constituted tread boards each have substantially the same configuration as that of the conventional tread board and are articulated one behind the other in the circulating direction of the conventional tread boards. The rear one is provided with a movable footboard so as to be moved up and down relative thereto, the movable footboard being adapted to be normally locked to the rear one of the specifically constituted tread boards by a lock means provided therein. When required, the movable footboard is made free to move by the release of the lock means and is supported by the front one of the specifically constituted tread boards through forks or bars which are provided in the front one so as not to normally interfere with the movement of the rear one. When the lock means of the rear one is released, the forks or bars are simultaneously protruded toward the rear one to support its footboard, and the footboard is moved together with the front one of the specifically constituted tread boards with their upper surfaces being flush with each other.

8 Claims, 13 Drawing Figures

MOVING STAIRCASE

BACKGROUND OF THE INVENTION

The present invention relates to a moving staircase and more particularly to a moving staircase which can transport not only standing passengers, but also vehicles such as wheelchairs for physically handicapped persons.

Japanese Laid-Open Patent Publication No. 41555/1981 discloses a moving staircase which can transport a wheelchair or the like. In that invention, deep tread boards which can accommodate a wheelchair are disposed at intervals along a circulating path between pairs of conventional tread boards. However, it reveals defects that since the radii of the circulating path of the tread boards for the wheelchair at the lower and upper end portion thereof becomes large, the depth of the main frame of the moving staircase becomes large, limiting the places in which it can be installed.

SUMMARY OF THE INVENTION

It is a principal object of the present invention to provide a moving staircase which can eliminate the defects in the conventional moving staircases described above and which can transport a wheelchair or the like in addition to usual standing passengers.

It is a further object of the present invention to provide a moving staircase which has a small-sized main frame and which can be installed wherever a usual moving staircase for standing passengers can be installed.

In accordance with the present invention a moving staircase is provided wherein along the circulating path of a number of conventional tread boards of the moving staircase which are articulated in an endless fashion in a manner publicly known in the art, at least a pair of specifically constituted tread boards is disposed between any two conventional tread boards so to be articulated thereto. The specifically constituted tread boards each have substantially a similar configuration to that of the conventional tread boards and are articulately arranged one behind the other along the circulating path. The rear one is provided with a movable footboard which can be moved up and down relative thereto, the movable footboard being adapted to be normally locked to the rear one of the specifically constituted tread boards by a lock mechanism provided therein. However, when required, the movable footboard is made free to move by the release of the lock mechanism and supported by the front one of the specifically constituted tread boards through forks or bars which are provided in the front one. The forks or bars normally do not interfere with the movement of the rear one, but when the lock mechanism of the rear one is released as described above, they are simultaneously protruded towards the rear one to support the footboard thereof by the operation of a forward and rearward movement mechanism, and the footboard is supported by the front one of the specifically constituted tread boards. When the front one moves upwards obliquely along the circulating path, the footboard of the rear one is forced to be moved upwards relative to the rear one when it follows the front one so that the upper surfaces of the footboards of the front and rear tread boards are always maintained flush with each other in a substantially horizontal plane, allowing a wheelchair to be laid thereon.

In a preferred embodiment of the present invention the forward and rearward movement mechanism is adapted to be moved by upwards and downwards driving mechanisms arranged at the lower and upper horizontal load run positions, respectively, and if the upwards and downwards driving mechanism is operated upwards, a driving belt mounted therein engages a sprocket wheel of the forward and rearward movement mechanism to operate it so that the forks or bars are protruded to support the footboard, and at the same time the driving belt engages a separate sprocket so as to retract the engaging bars and release the constraint of the footboard.

BRIEF DESCRIPTION OF THE DRAWINGS

These and other objects of the present invention will become more readily apparent upon reading the following description and upon reference to the accompanying drawings, in which.

DESCRIPTION OF THE PREFERRED EMBODIMENTS

Figure 1:
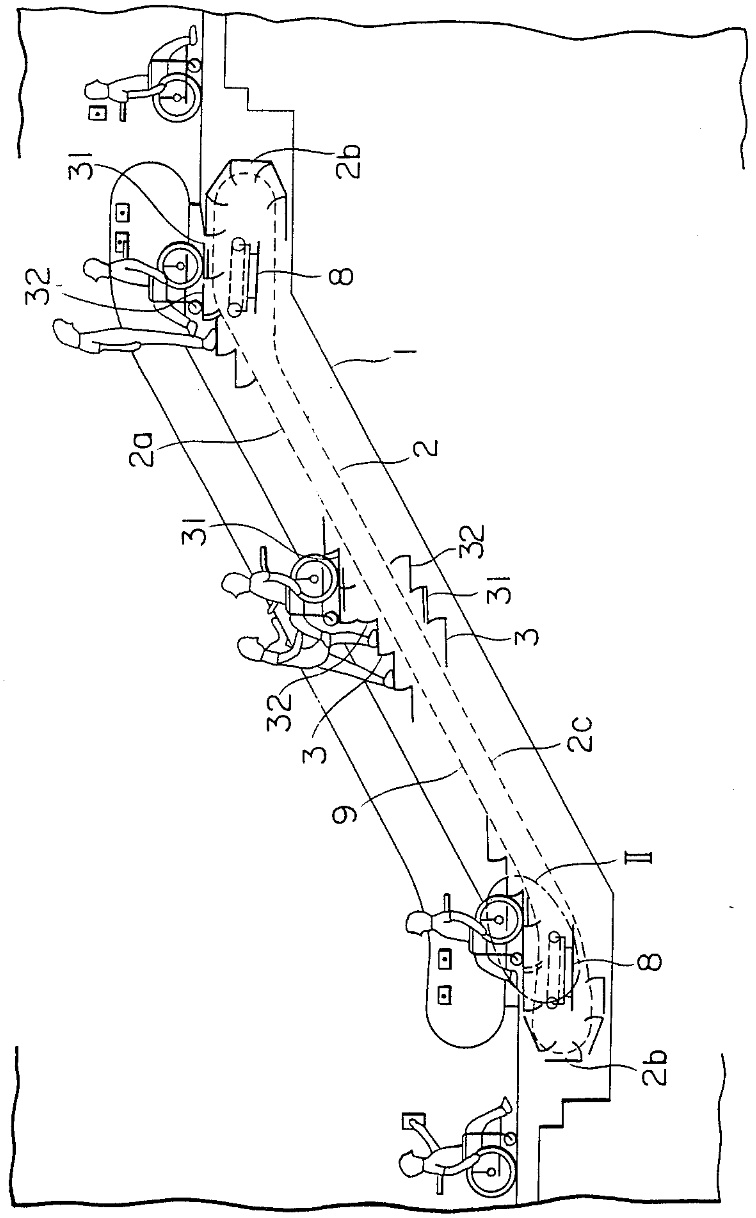
FIG. 1 is a schematic view illustrating the fundamental idea of a moving staircase in accordance with the present invention.

Reference is made now to FIGS. 1 to 11 wherein is shown an embodiment of the present invention. In the drawings, in particular in FIGS. 1 to 4, reference numeral 1 denotes a main frame of the moving staircase, and 2 denotes an endless circulating path constituted mainly from rails to be described fully later in which an upper load run 2*a*, direction changing parts 2*b* and a lower return run 2*c* are provided at the upper portion, both end portion, and the lower portion of the main frame 1, respectively. 3 is a number of conventional tread boards of a first kind arranged along the circulating path 2, 3*a* is a shaft of the tread board 3, 3*b* represents wheels rotatably provided at each end of the shaft 3*a*, and 3*c* represents rear wheels rotatably supported by the tread board 3 on each of its sides at the portion of the tread board 3 which is remote from the shaft 3*a*. 31 indicates a number of specifically-constituted tread boards of a second kind disposed between a pair tread boards of the first kind 3, preferably at equal interyals along the circulating path 2, and constituted similarly to the first tread boards 3, i.e. each is provided with a shaft 31*a* at its front end portion, two front wheels 31*b* rotatably mounted to the shaft 31*a* at its ends, and two rear wheels 31*c* rotatably supported by the tread board 31 at each side remote from the shaft 31*a*.

Figure 4:
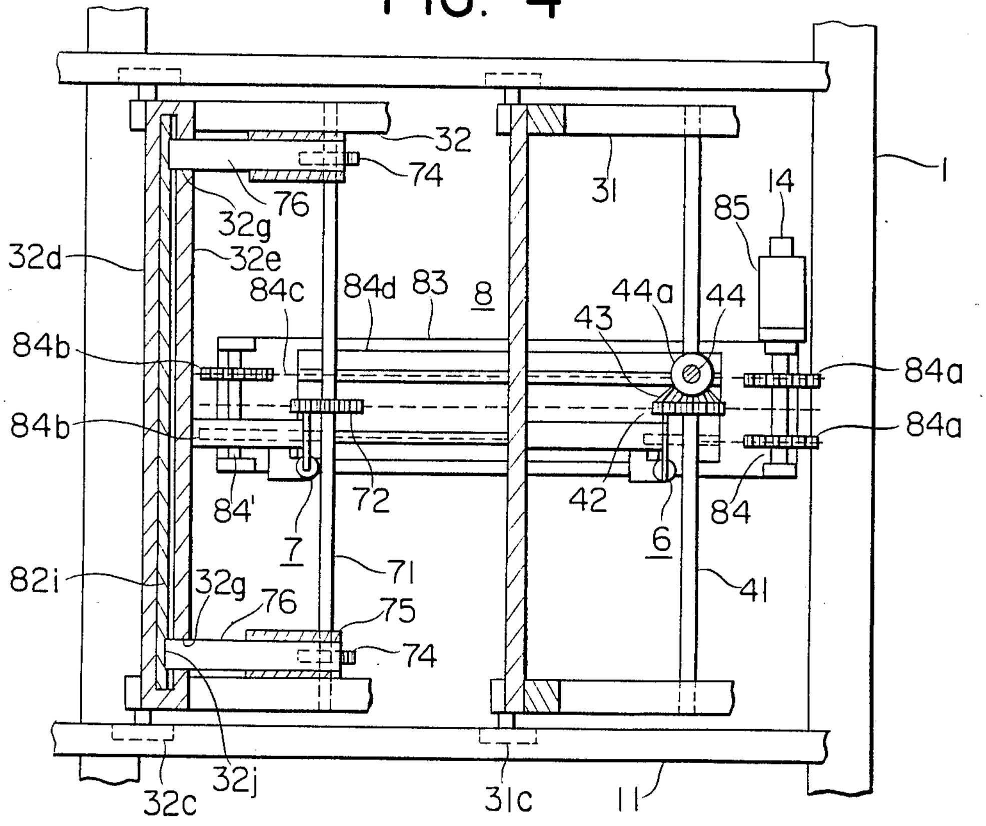
FIG. 4 is a sectional plan view of FIG. 2 taken along the lines IV—IV of FIG. 2.
Figure 5:
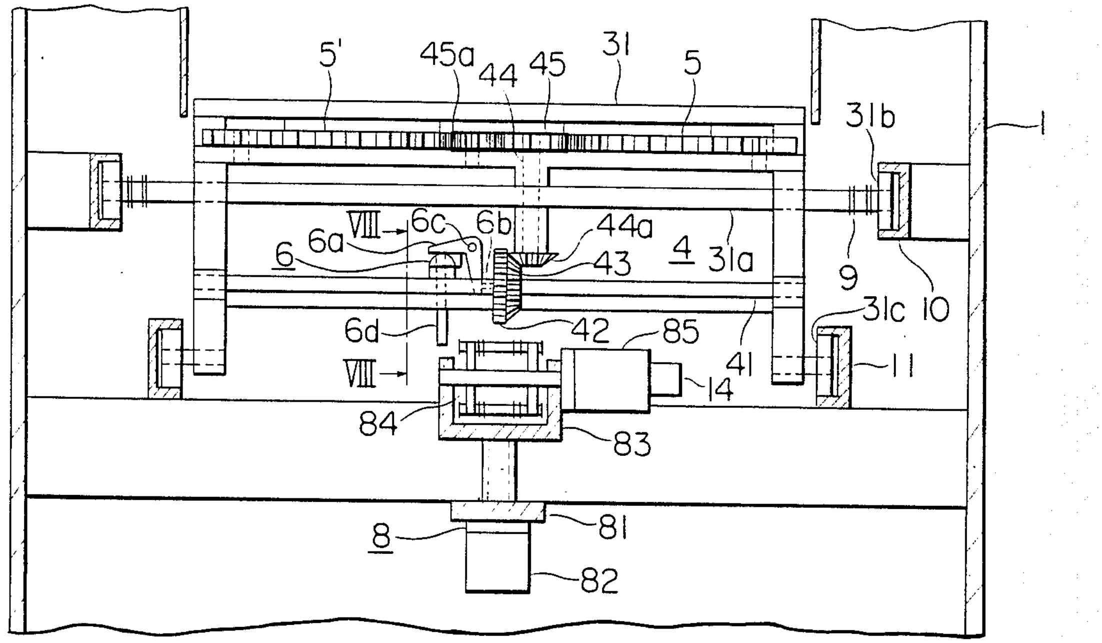
FIG. 5 is a side sectional view of FIG. 2 taken along the lines V—V of FIG. 2.

4 is a forward and rearward moving mechanism for forks provided in the tread board of the second kind 31 within its lower space which comprises, as shown in FIGS. 4 and 5, a shaft 41 rotatably mounted on the tread board of the second kind 31 and having its lengthwise direction disposed transversely to the circulating direction of the tread board of the second kind 31, an input or driven member 42 fixedly secured to the shaft 41 and comprising a sprocket wheel, a number of holes 42*a* formed in the input member 42 equidistant from the axis of the shaft 41, a shaft 44 vertically and rotatably mounted on the under surface of the tread board of the second kind 31, a bevel gear 44*a* fixedly secured to the shaft 44 at its lower end so as to be in mesh with the bevel gear 43, and a spur gear 45 fixedly secured to the upper end of the shaft 44.

Figure 3:
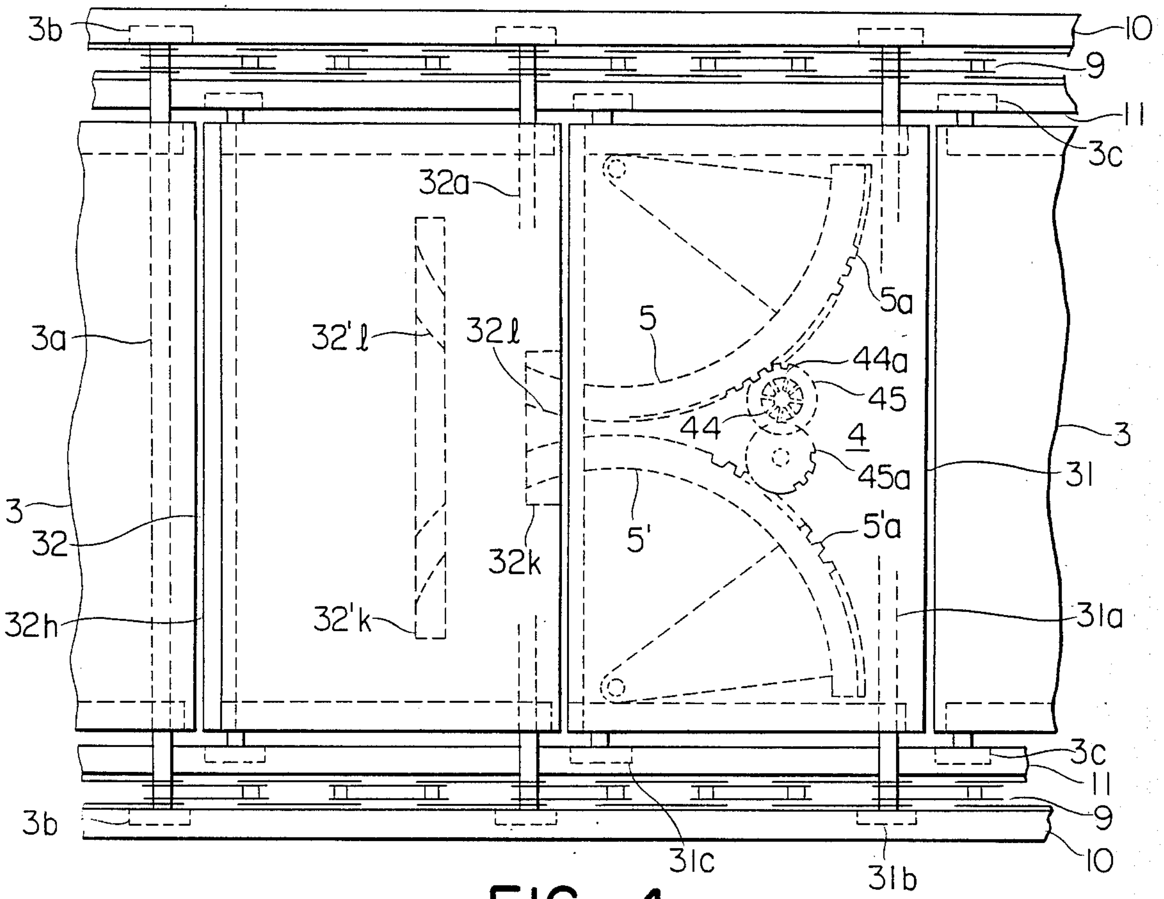
FIG. 3 is a plan view of the portion illustrated in FIG. 2.

5, 5′ are forks each having substantially the shape of a sector shape, the center of which is pivoted on the tread board of the second kind 31 on its under surface at the portion remote from the shaft 31*a*, i.e. the portion confronting the lower end of the main frame 1 and in this neighborhood. The forks 5, 5′, as shown in FIG. 3, are each formed with teeth 5*a* or 5′*a* on the outer periphery of the circular arc portion which mesh with the spur gear 45 or 45*a*. The spur gear 45*a* is pivotally mounted to the tread board of the second kind 31 on its under surface so as to be in mesh with both the spur gear 45 and with the teeth 5′*a* formed on the outer periphery of the circular arc portion of the fork 5′ which is arranged, as described above, on the tread board of the second kind 31 on its under surface in symmetry with respect to the fork 5.

Figure 8:
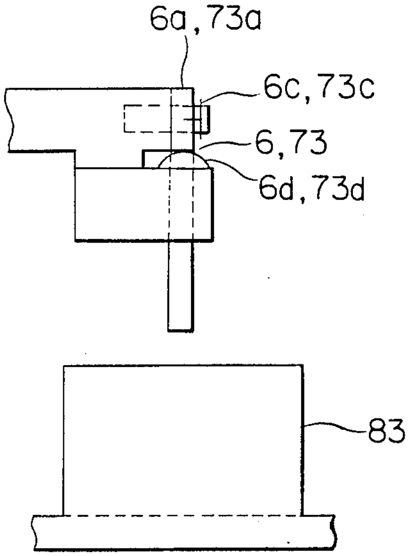
FIG. 8 is a vertical sectional view of FIGS. 5 and 6 taken along the lines XIII—XIII of FIGS. 5 and 6.

As shown in FIGS. 5 and 8, element number 6 is a blocking mechanism which comprises an L-shaped lever 6*a* pivotally mounted at its vertex to the tread board of the second kind 31 on its under surface a pin 6*b*, a torsion spring 6*c*, and a rod 6*d*. The pin 6*b* is provided at the end of one of the arms of the lever 6*a* and faces the side surface of the input member 42 so as to correspond to any one of the pin holes 42*a*. The torsion spring 6*c* is mounted at the connecting portion at the vertex of the lever 6*a* to the tread board 31 and urges the lever 6*a* so that the pin 6*b* fits into one of the pin holes 42*a*. The rod 6*d* is vertically shiftably held by the tread board of the second kind 31 on its under surface and has its upper end abut against the lower surface of the other of the arms of the lever 6*a*.

Figure 2:
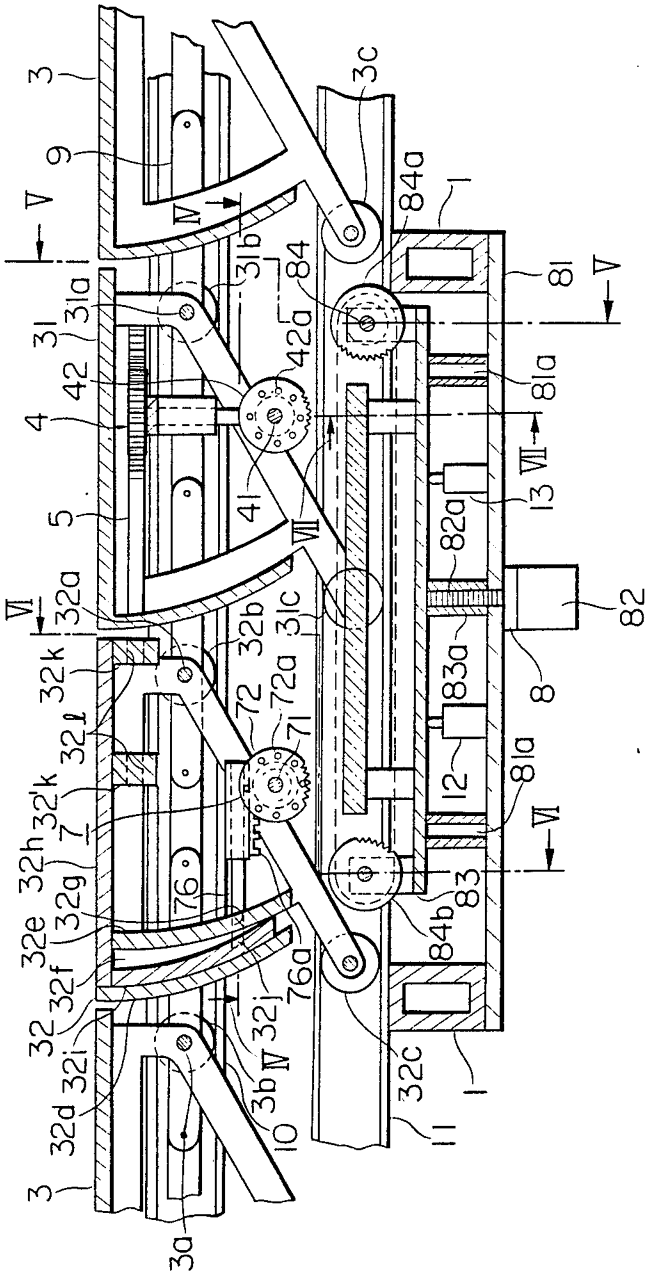
FIG. 2 is a vertical sectional view of a portion of FIG. 1 enclosed by the dot-and-dash lines II of FIG. 1 on a larger scale.

In FIG. 2 reference numeral 32 is a tread board a third kind adjoining the tread board of the second kind 31 at the lower side of the main frame 1, the tread board 32 being provided in the circulating path 2 and being constituted similarly to the tread board of the first kind 3. It comprises a shaft 32*a* at its front end, front wheels 32*b* rotatably mounted to the ends of the shaft 32*a*, and rear wheels 32*c* rotatably mounted to the tread board 32 at its sides remote from the shaft 32*a*. 32*d* is a riser of the tread board of the third kind 32, 32*e* is an upright wall arranged along the riser 32*d* rigidly connected to the tread board of the third kind 32 at its under surface and spaced apart from the riser 32*d* with a gap 32*f* being left therebetween, 32*g* represents holes formed in the upright wall 32*e* near both ends, as shown in FIG. 4. 32*h* is a movable footboard of the tread board of the third kind 32, and 32*i* is a riser of the movable footboard 32*h* suspended from the rear end thereof and adapted to be disposed within the gap 32*f*, the riser 32*i* having a curved surface conforming to the shape of the inner surface of the riser 32*d* so that there is no clearance between its outer surface and the inner side of the riser 32*d* throughout the upward movement of the movable footboard 32*h*. In FIG. 4, reference numeral 32*j* indicates engaging depressions formed in the riser 32*i* near each of its sides which correspond to the holes 32*g* formed in the upright wall 32*e*. 32*k* and 32′*k* shown in FIGS. 2 and 3 are engaging members fixedly and transversely mounted to the under surface of the movable footboard 32*h* with a longitudinal separation left therebetween. The engaging members 32*k* and 32′*k* are formed with engaging holes 32l and 32′l, respectively, adapted to engage the forward end portions of the forks 5, 5′, respectively, when the latter are actuated.

Figure 6:
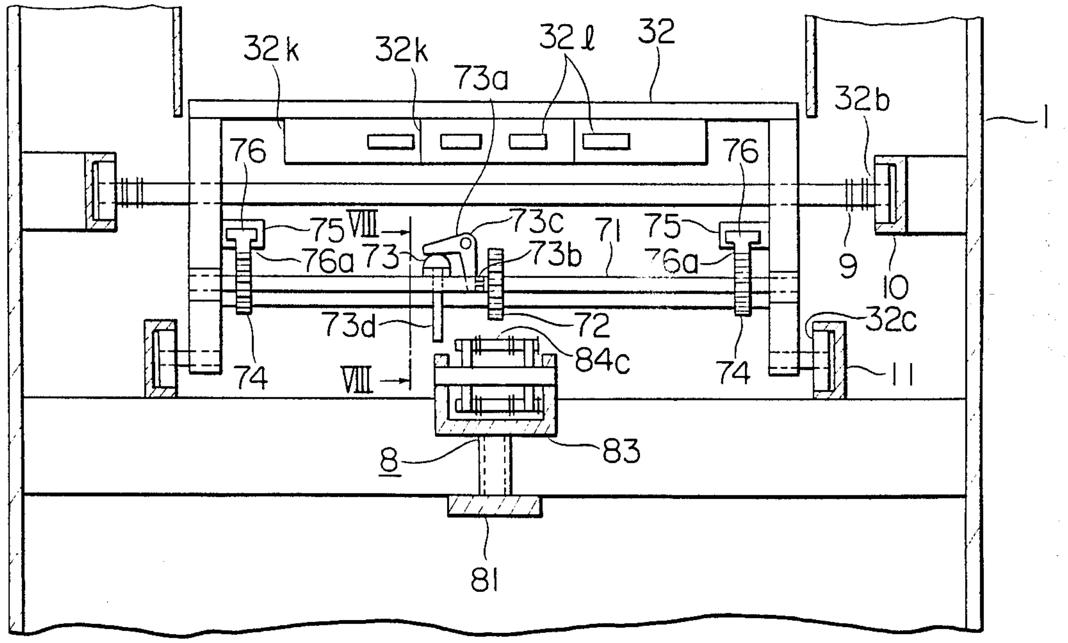
FIG. 6 is a side sectional view of FIG. 2 taken along the lines VI—VI of FIG. 2.

7 is a lock mechanism provided in the tread board of the third kind 32 comprising, as shown in FIGS. 2, 4, and 6, a shaft 71 arranged in parallel with the shaft 41 of the tread board of the second kind 31 and rotatably mounted to the tread board 32 in a manner similar to the shaft 41 in the tread board of the second kind 31, an input member 72 fixedly secured to the shaft 71 at its mid-portion similar to the input member 42 on the shaft 41 and longitudinally aligned therewith, pin holes 72*a* formed in the wall of the input member 72 on a circle at regular angular intervals similar to the pin holes 42*a* of the input member 42, and a blocking mechanism 73 having a constitution similar to the blocking mechanism 6, comprising a lever 73*a*, a pin 73*b*, a torsion spring 5*c*, and a vertical rod 73*d* as most clearly shown in FIGS. 6 and 8.

As shown in FIGS. 4 and 6, reference numeral 74 indicates spur gears fixedly connected to the shaft 71 near each end, 75 indicates guide members fixedly secured to the tread board of the third kind 32 below it by any suitable means at intervals so as to be located above each of the respective spur gears 74, the guide members 75 each having generally a channel-shaped cross section and being provided with confronting flanges at the open end portion, the open end portion being disposed downwards and elongating horizontally in the longitudinal direction. 76 indicates engaging rods each having a cross section substantially corresponding to the space formed within the guide members 75 and shiftably received therein, each engaging rod 76 being arranged so as to pass through the hole 32*g* formed in the upright wall 32*e* and adapted to engage the depression 32*j* formed in the riser 32*i* of the moving footboard 32*h*. Each engaging rod 76 is provided on its under surface with a rack 76*a* which protrudes through the open end portion of the guide member 75 and which is adapted to mesh with the spur gear 74.

Figure 7:
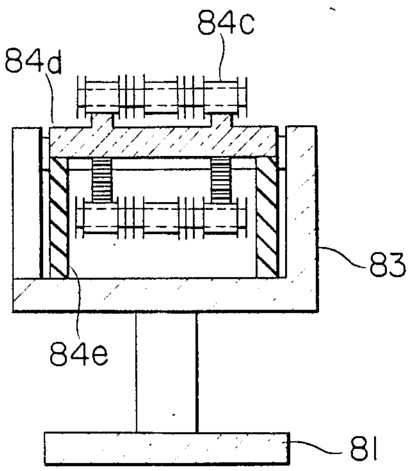
FIG. 7 is a side sectional view of FIG. 2 taken along the lines VII—VII of FIG. 2.

As shown in FIGS. 4, 5, 6 and 9, reference numeral 8 indicates a pair of upwards and downwards driving mechanisms mounted to horizontal frames 81 which are longitudinally secured to the main frame 1 at the top and bottom horizontal end portions of the upper load run 2*a*. Each driving mechanism 8 comprises a pair of protruding vertical guide rods 81*a* symmetrically mounted on the frame 81 with regard to the longitudinal midpoint, an electric motor 82 for up and down movement which is fixedly secured to the frame 81 on its under surface at its longitudinal midpoint and provided with a threaded output shaft 82*a*, a movable frame 83 arranged in parallel with the frame 81, a cylindrical engaging member 83*a* fixedly secured to the lower surface of the movable frame 83 at its longitudinal midpoint and having a female thread which engages the male thread of the output shaft 82*a*, and a pair of cylindrical bushings 83*b* which loosely receive the guide rods 81*a* of the frame 81. 84 is a shaft rotatably mounted in the movable frame 83 at the front end portion thereof as viewed in the longitudinal direction of the main frame 1 so as to be transverse thereto. 84*a* indicates sprocket wheels fastened to the shaft 84 spaced apart from each other and symmetric with regards to the input member 42 of the tread board of the second kind 31. 84*b* indicates sprocket wheels which are rotatably supported by the movable frame 83 through a shaft 84′ secured thereto at the end of the movable frame 83 opposite the shaft 84 and which are aligned with the sprocket wheels 84*a*. 84*c*, as best shown in FIG. 7, is an endless drive belt comprising three-row roller chains with the outer rows being reeved on the sprocket wheels 84*a* and 84*b*, and the central row being adapted to engage the input members 42 and 72 when the endless drive belt 84*c* is driven. 84*d* is a support member provided in the movable frame 83 below the upper run of the drive belt 84*c*, 84*e* represents support elements, each made of an elastic material, to elastically support the support member 84*d* on the movable frame 83, and 85 is an electric motor mounted on the movable frame 83 to drive the shaft 84.

Figure 11:
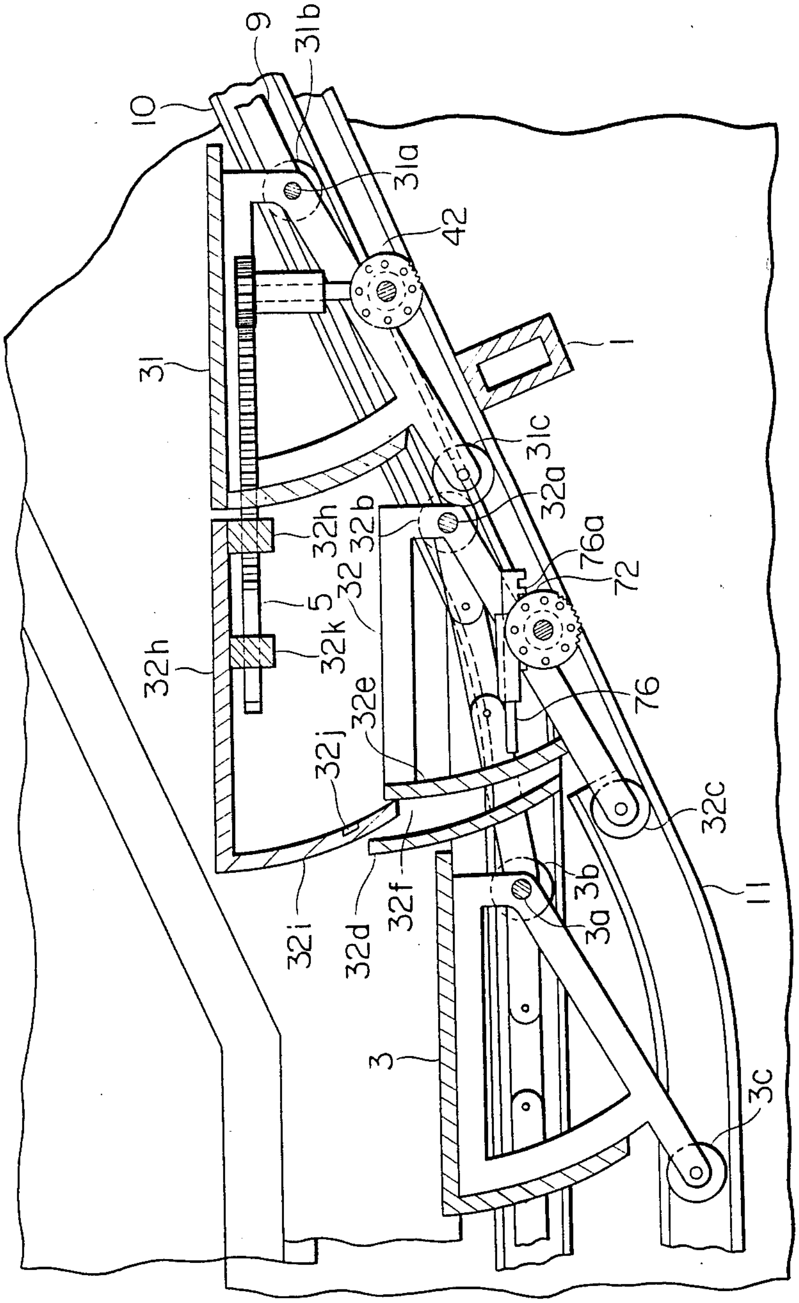
FIG. 11 is a view illustrating the conditions of the tread boards of the second and third kinds shown in FIG. 9 when they move along the oblique upper load run of the circulating path at its intermediate position.

As shown in FIGS. 2 and 11, reference numeral 9 indicates tread board chains arranged in the frame 1 along the circulating path 2 so as to be engaged by the shafts 3*a*, 31*a*, and 32*a* of the tread boards 3, 31, and 32 of the first, second, and third kinds, respectively. 10 indicates rails for front wheels secured to the main frame 1 along the circulating path 2 so as to guide the front wheels 3*b*, 31*b*, and 32*b*, of the tread boards 3, 31, and 32 of the first, second and third kinds, respectively. 11 indicates rails for rear wheels secured to the main frame 1 along the circulating path 2 so as to guide the rear wheels 3*c*, 31*c* and 32*c* of the tread boards 3, 31, and 32 of the first, second, and third kinds, respectively. 12 is a switch mounted on the movable frame 81 which acts as a first detector to detect the descent of the movable frame 83, 13 is a switch mounted on the frame 81 which acts as a second detector to detect the lifting of the movable frame 83, and 14 is an integrating switch which acts which is mounted on the shaft of the electric motor 85. The integrating switch 14 is reponsive to the rotation of the shaft and detects the amount of projection or withdrawal of the forks 5, 5′ and engaging rods 76 to be described later.

Now the operation of the embodiment of the present invention which has the constitution described above will be explained.

As is apparent from the above description, in this embodiment the tread boards of the second kind 31 are arranged together with a tread board of the third kind 32 between a pair of tread boards of the first kind 3 at regular intervals along the circulating path 2. The tread board of the third kind 32 is arranged behind the tread board of the second kind 31 as viewed in the moving direction of the drive run of the circulating path 2, and these tread boards 3, 31, and 32 are articulated together by the tread board chains 9 in a coneneitonal manner well known in the art. The forks 5, 5′ are normally held in retracted positions as shown in FIG. 3 by the dotted lines, the driving mechanism 8 being in a position to keep the moving frame 83 at the lowered position shown in FIGS. 5 and 6, with the engaging rods 76 each passing through the one of holes 32*g* formed in the upright plate 32*e* of the tread board of the third kind 32 and engaging the engaging recesses 32*j* formed in the riser 32*i* of the movable footboard 32*h* of the tread board of the third kind 32 as shown in FIG. 2 so that the movable footboard 32*h* is held by the tread board of the third kind 32 through the rods 76. Further, the pins 6*b* and 73*b* of the blocking mechanisms 6 and 73, respectively, fit in one of the pin holes 42*a* 72*a* of the input members 42 and 72, respectively, as shown in FIGS. 5 and 6 so that the forward and rearward movement mechanism 4 and the lock mechanism 7 have their operations blocked.

It is now assumed that at the states of the various elements described above a driving means (not shown) provided in the main frame 1 is actuated to drive the tread boards 3, 31 and 32 of the first, second and third kinds, respectively, through the tread board chains 9 so that they perform a circulating movement along the circulating path 2. In this case, as shown in FIG. 11, the front wheels 3*b*, 31*b* and 32*b* are guided by the front wheel rails 10, while the rear wheels 3*c*, 31*c* and 32*c* are guided by the rear wheel rails 11, and the tread boards 3, 31 and 32 of the first, second and third kinds, respectively, move horizontally at the end portions of the upper load run 2*a*, and obliquely at the midportion thereof with their attitude being held horizontally, whereby standing passengers can be transported as schematically shown in FIG. 1, quite similarly to a conventional moving staircase.

During the movement of the moving staircase under the conditions described above, when a passenger sitting on a wheelchair is to be transported, e.g. from the lower end portion of the upper load run to the upper end portion thereof the following procedure has to be taken.

Figure 9:
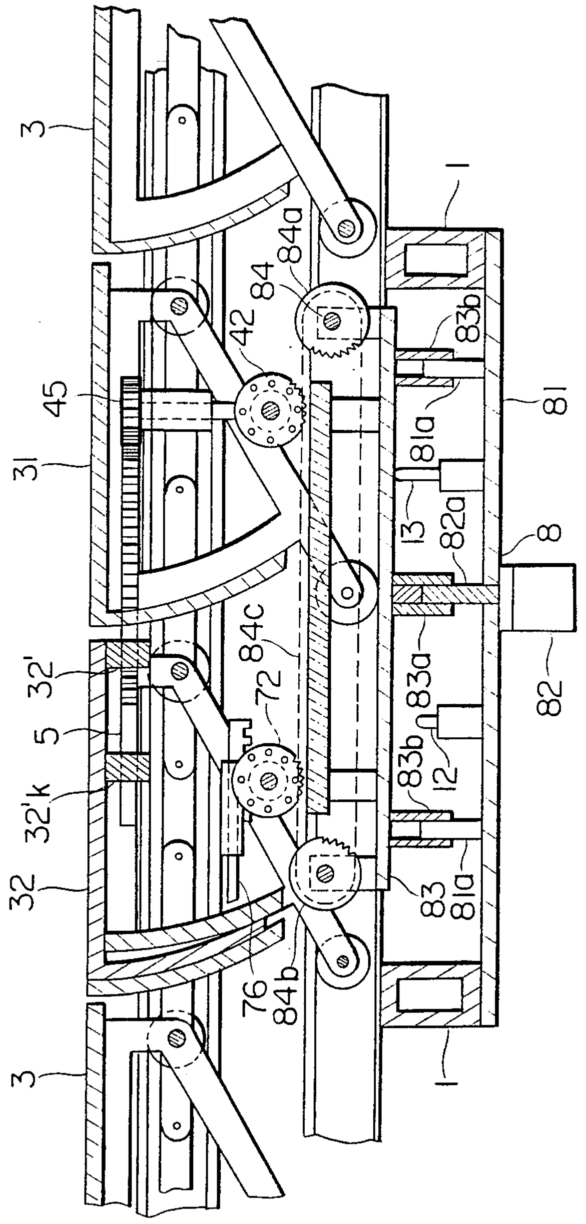
FIG. 9 is a view similar to FIG. 2, but illustrating the operations of the drive mechanism and other parts shown in FIG. 2.
Figure 10:
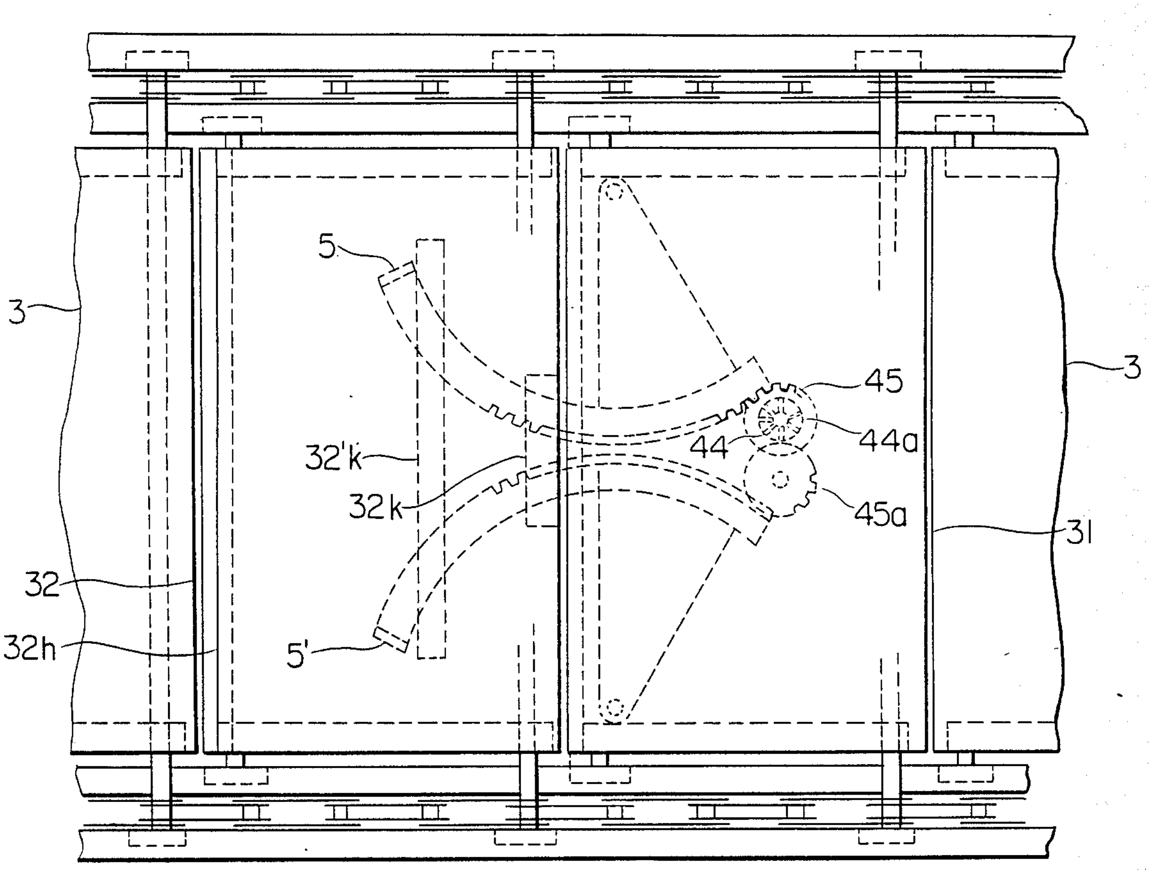
FIG. 10 is a plan view of FIG. 9.

When the tread boards of the second kind 31 and third kind 32 reach the horizontal moving position at the lower end of the upper load run 2*a* as shown in the lower left pair of FIG. 1 they are caused to be stopped there by any suitable means (not shown) so that the various elements occupy the conditions shown in FIGS. 2 and 3. In this state, when the motor 82 of the upwards and downwards driving mechanism 8 is energized, the movable frame 83 is raised by the engagement of the threaded shaft 82*a* constituting the output shaft of the motor 82 with the female thread formed in the engaging member 83*a* of the movable frame 83. Upon detection of the raising of the movable frame 83 to a predetermined height by the second detector 13, the motor 82 is deenergized and stopped and in this state the driving belt 84*c* has its middle endless roller chain engaged by the input members 42 and 72 as shown in FIG. 9. At the same time, since the vertical rods 6*d* and 73*d* of the blocking mechanisms 6 and 3, respectively, are urged upwards by the movable frame 83, the respective levers 6*a* and 73*a* thereof are swung about the pivots 6*c* and 73*c* thereof, respectively, thereby the pins 6*b* and 73*b* there thereof, respectively. The pins 6*b* and 73*b* of the levers are thereby caused to come out of one of the pin holes 42*a* and 72*a* of the input members 42 and 72, respectively. Subsequently, as shown in FIG. 4, the motor 85 of the upwards and downwards driving mechanism 8 is energized to drive the sprocket wheels 84a through the shaft 84 so that the sprocket wheels 84a drive the outer roller chains of the drive belt 84c in association with the sprocket wheels 84b, and the input member 42 of the forward and rearward moving mechanism 4 is driven owing to its coming into mesh with the center endless roller chain of the drive belt 84c. Therefore, as shown in FIGS. 3 and 5, the bevel gear 43 integral with the input member 42 drives the bevel gear 44a in mesh therewith, and the spur gear 45 rigidly connected to the bevel gear 44a through the shaft 44 drives the fork 5 due to the meshing of the spur gear 45 with the teeth 5a formed on the outer periphery of the circular arc portion of the fork 5. At the same time, the fork 5' is similarly driven through the meshing of teeth 5'a formed on the outer periphery of circular arc portion of the fork 5', because the teeth 5'a are in mesh with the spur gear 45a which is in turn in mesh with the spur gear 45. Thus, the forks 5, 5' are simultaneously swung about their pivots, and the free end parts of their circular arc portions pass through the holes 32l formed in the engaging member 32k and the holes 32'l of the engaging member 32'k, both secured to the tread board of the third kind 32 as shown in FIGS. 9 to 11. When the engagement of the forks 5, 5' with the engaging members 32k, 32'k, respectively, is completed, the third detector 14 show in FIG. 4 is actuated so that the motor 85 is deenergized and stopped. On the other hand, the movement of the drive belt 84c simultaneously rotates the input member 72 of the lock mechanism 7 through its engagement with the center endless roller chain of the drive belt 84c to rotate the shaft 71 which is integral therewith, and the spur gears 74 ridigly connected to the shaft 71 move the engaging rods 76 by the engagement of the gears 74 with the racks 76a formed on the rods 76 so that the engaging rods 76 are moved through the holes 32g opened in the upright wall 32e the tread board of the third kind 32 from the recesses 32j formed in the riser 32i of the movable footboard 32h, thus releasing the engagement between the riser 32i and the upright wall 32e, and the state of the various components as shown in FIGS. 9 and 10 results. In this case, since the upper run of the drive belt 84c is supported by the support member 84d which is elastically mounted on the movable frame 83 through the elastic support elements 84e, the drive belt 84c is smoothly engaged by the input members 42 and 72. See FIG. 7.

When the motor 82 for the upwards and downwards movement mechanism 8 is then driven in reverse from the state shown in FIGS. 9 and 10, the movable frame 83 is lowered and the motor 8 is deenergized as the movable frame 83 presses the first detector 12. At the same time, the lowering of the movable frame 83 operates the blocking mechanism 6 for the rearward movement mechanism 4 as well as the lock mechanism 7 for the upwards and downwards driving mechanism 8, blocking their movements by the engagements of the pins 6b and 73b of the blocking mechanism 6 and 73 with one of the holes of the input members 42 and 72, respectively.

When a wheelchair is laid upon the plane thus formed by the tread board of the second kind 31 and the moving footboard 32h of the tread board of the third kind 32, and the moving staircars is again operated, the tread board of the second kind 31 switches over to an oblique movement with its surface being kept horizontally. In this case, since the movable footboard 32h of the tread board of the third kind 32 is supported by the forks 5, 5', it is raised relative to the tread board of the third kind 32 so as to adopt the state shown in FIG. 11, the surfaces of the tread board 31 and the footboard 32h being in flush with each other. Thus, the plane constituted by both boards 31, 32h for loading the wheelchair is held substantially horizontally, and when the tread boards of the second kind 31 and third kind 32, reach the upper horizontal end portion of the upper load run 2a, the moving staircase is caused to be stopped by a suitable means (not shown), and the wheelchair is allowed to be smoothly moved away from the moving staircase.

Thereafter, the upwards and downwards driving mechanism 8 similarly provided at the upper end portion of the upper drive run 2a is manipulated to move the movable frame 83 upwards so that the drive belt 84c engages the input members 42 and 72, and the forks 5 and 5' are caused to be retracted by operating the motor 85 in reverse, releasing the constraint of the movable footboard 32h of the tread board of the third kind 32 by the forks 5, 5'. At the same time, the engaging rods 76 are thrust into the recesses 32j formed in the riser 32d of the movable footboard 32h of the tread board of the third kind 32 through the holes 32g formed in the upright wall 32e integral therewith, the movable footboard 32h being held by the tread board of the third kind 32 through the rods 76. Upon operating the upwards and downwards driving mechanism 8 in reverse, the moving staircase can be used again for the transportation of a standing passenger since the movable footboard 32h is constrained to the tread board of the third kind 32 through the reverse movements of the various elements caused by the lowering of the movable frame 83.

Thus, it will be appreciated that the moving staircase in accordance with the present invention allows the user of a wheelchair to be transported smoothly, and since it necessiates no provision of a deep tread board to carry a wheelchair thereon, the main frame 1 is not required to be made large so that its installment can be facilitated. Further, since the input members 42 and 72 are so arranged that they are engaged by the drive belt 84c disposed lengthwise along the circulating path 2, the dimensional tolerance of the stoppage locations of the tread boards of the second kind 31 and third kind, 32 when moving horizontally at the upper and lower end portions of the upper load run 2a is large. Thus, even though the tread board 31 and 32 are made to be stopped by a simple stopping mechanism, the input members 42, 72 and the driving belt 84c can be normally engaged with each other.

Figure 12:
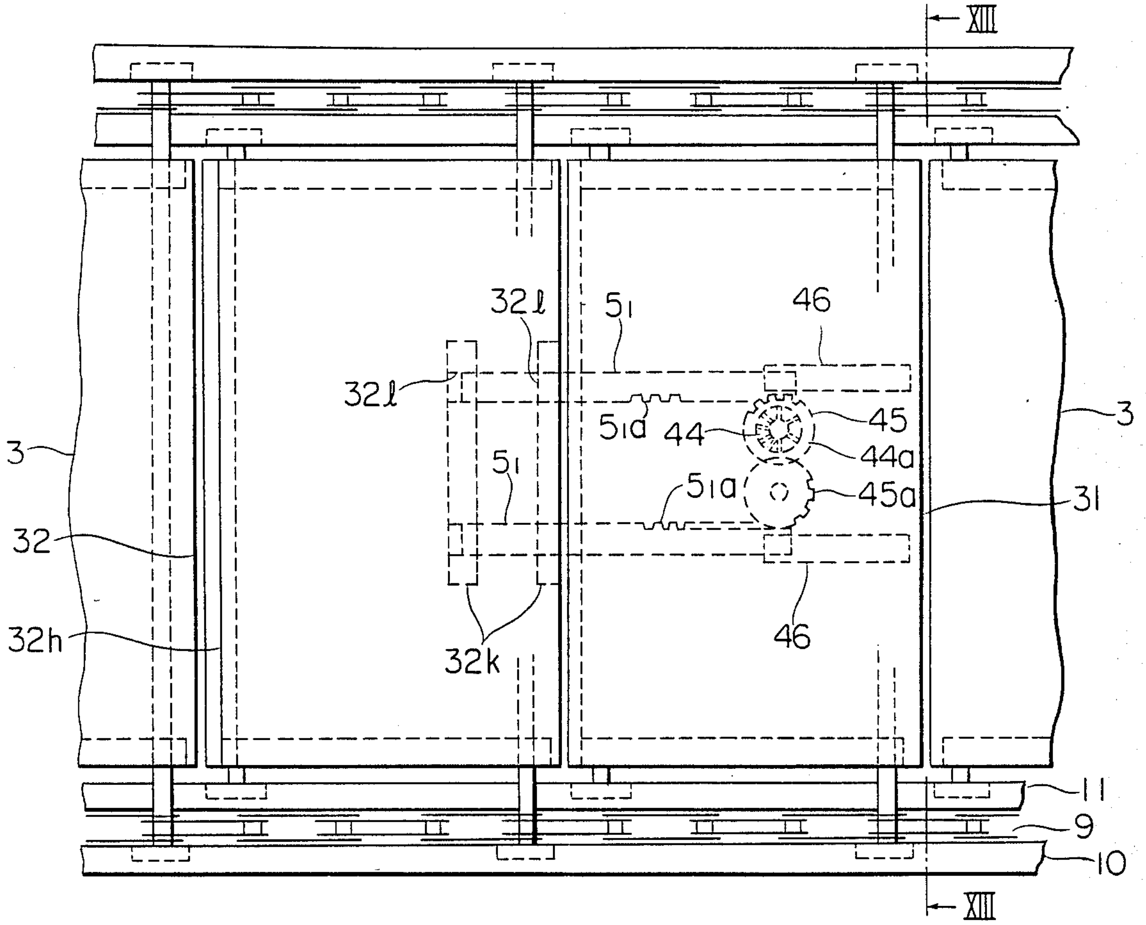
FIG. 12 is a view similar to FIG. 10, but illustrating another embodiment of the present invention.
Figure 13:
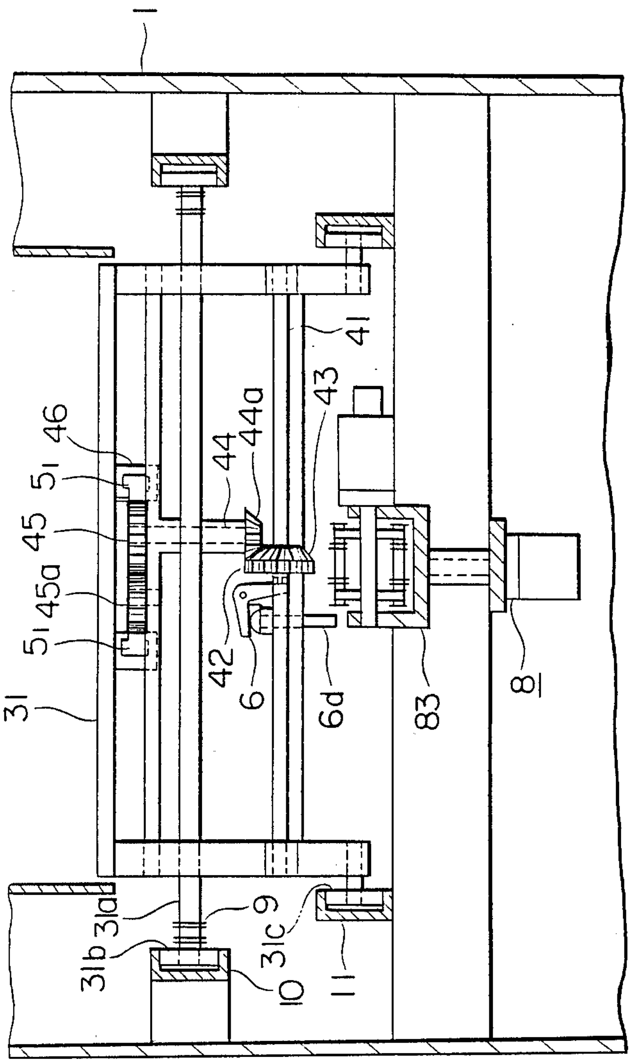
FIG. 13 is a side sectional view of FIG. 12 taken along the lines XIII—XIII of FIG. 12.

Another embodiment of the present invention is shown in FIGS. 12 and 13 wherein identical or similar elements to those shown in FIGS. 1 to 11 are affixed with the same reference numerals as those used in FIGS. 1 to 11.

In FIGS. 12 and 13, reference numeral 46 designates guide members fixedly secured to the lower surface of the tread board of the second kind 31 so as to be parallel to the direction of movement of the moving staircase and be symmetric with respect to the longitudinal center line of the circular path 2. The guide members 46 each have generally a channel-shaped cross section with the flange which is disposed outwards being wider than the flange which is disposed inwards as shown in FIG. 13. $5_1$ indicates straight rod-like bars linearly shiftably received within the space formed within the guide members 46 each having generally an L-shaped cross section so as to conform to the inner cross sectional outline of the guide members 46. Each bar $5_1$ is formed with a rack $5_{1}a$, which meshes with the spur gear 45 or 45*a*, on its side confronting the other bar $5_1$. Since in this embodiment the rods $5_1$ are adapted to be thrust forwards when the racks $5_{1}a$ are driven by the rotating spur gear 45 or 45*a* and to support the movable footboard 32*h* of the tread board of the third kind 32 quite similarly to the case of the embodiment shown in FIGS. 1 to 11, it is apparent that the embodiment shown in FIGS. 12 and 13 operates similarly to the embodiment shown in FIGS. 1 through 11, and a detailed explanation will therefore be omitted.

From the foregoing it will be appreciated that in the present invention, tread boards of a first kind which are made to be circulated along a circulating path have a tread board of a second kind and a tread board of a third kind disposed therebetween at several positions along the circulating path, preferably at regular intervals. The tread board of the second kind which is provided with protrudable forks, and the tread board of the third kind follows the above tread board of the second kind and is provided with a movable footboard that is constructed to be supported by the portrudable forks when protruded. Further there are provided upwards and downwards driving mechanisms at the lower and upper horizontal portions of the upper load run of the circulating path, each of which is adapted to actuate the forward and rearward movement mechanism provided at the end portions of the circulating path, respectively, so as to urge the forks to be protruded or retracted. Thus, at the horizontally moving portions of the circulating path, the movable footboard of the tread board of the third kind can be supported by the forks provided on the tread board of the second kind so that the movable footboard moves upwards out of the tread board of the third kind as the tread board of the second kind moves upwards obliquely, making a place for supporting a wheelchair to be maintained horizontally so that the user of the wheelchair can be smoothly transported. In this case, in accordance with the present invention, since there is no need of providing a tread board having specific dimensions adapted for the wheelchair, the radius of the circulating path at the upper and lower end portions necessary for carrying out the change of moving direction need not be large, a main frame of small dimensions is sufficient there are little limitation to the installment of the moving staircase, and its installation is facilitated.

It is to be understood that although certain forms of the present invention have been illustrated and described, it is not to be limited thereto except insofar as such limitations are included in the following claims.

What is claimed is:

1. A moving staircase comprising:

a main frame disposed substantially obliquely and constituting a circulating path comprising an oblique load run on its upper side, an oblique return run on its lower side, and direction changing paths connecting said load and return runs at the lower and upper ends, whereby substantially horizontal upper and lower parts are formed in said load run at said direction changing path respectively;

a number of tread boards of a first kind which are articulated together in an endless fashion along said circulating path so as to be normally continuously circulated in one direction such that they move substantially horizontally at said upper as well as lower ends but move obliquely upwards with each of said tread boards being maintained substantially horizontally during their travel along said oblique load run of said circulating path;

at least one tread board of a second kind arranged in said main frame so as to be disposed between any two of said tread boards of the first kind and to be circulated therewith, said tread board of the second kind being provided below it with fork means, by a forward and rearward movement mechanism also provided, below said fork means for normally holding said fork means at a retracted position and for urging said fork means to be protruded substantially horizontally towards said lower end of said circulating path when said forward and rearward movement mechanism is actuated;

at least one tread board of a third kind arranged in said main frame so as to adjoin said tread board of the second kind at its rear end portion and to be moved together with said tread board of the first kind, said tread board of the third kind being provided with a movable footboard which is movable up and down relative to said tread board of the third kind and with its upper surface maintained horizontally and which is normally held at a lowered position, but which, upon actuation of said forward and rearward movement mechanism is moved upwards as said tread board of the second kind moves along said oblique loading run and is firmly supported by said fork means which are caused to be protruded towards said movable footboard to firmly support it;

a pair of upwards and downwards driving mechanisms provided at said upper and lower ends of said circulating path, respectively, a horizontal longitudinal frame which is secured to said main frame below said upper load run centrally thereof and on which each of said pair of upwards and downwards driving mechanisms is mounted, said upwards and downwards driving mechanism usually being held at a lowered position, but when said tread boards of the second and third kinds are stopped at said upper or lower end of said circulating path, the corresponding upwards and downwards driving mechanism is adapted, if required, to actuate said forward and rearward mechanism so that it operates to cause said fork means provided in said tread board of the second kind to protrude towards or retract from said tread board of the third kind.

2. A moving staircase as claimed in claim 1, wherein a number of pairs of said tread boards of the second and third kinds are provided at regular intervals along said circulating path, each pair being interposed between a pair of said tread boards of the first kind.

3. A moving staircase as claimed in claim 1, wherein said forward and rearward movement mechanism comprises a horizontal shaft rotatably supported by said tread board of the second kind below it so as to extend transversely with respect to the moving direction of said staircase, a first bevel gear which acts as an input member secured to said shaft at its midportion, a spur gear integrally formed with said bevel gear concentrically thereto, a first vertical shaft rotatably supported by said tread board of the second kind below it substantially centrally thereof and provided at its lower end with a second bevel gear so as to be in mesh with said first bevel gear, a first spur gear secured to said first vertical shaft at its upper end, and a second spur gear rotatably supported by a second vertical shaft secured to said tread board of the second kind below it spaced apart from said first vertical shaft laterally and being in mesh with said first spur gear, said first and second spur gears having the same outer diameter, said first and second spur gears being in mesh with teeth formed in respective ones of said fork means.

4. A moving staircase as claimed in claim 3, wherein said fork means each have the shape of a sector disposed in parallel with the under surface of said tread board of the second kind and are arranged symmetrically with respect to the longitudinal center line of said tread board of the second kind thereof, and said sectors have their centers pivoted to said tread board of the second kind below it at the opposite sides near said rear end, the radius of the arcuate outer periphery of each of said sectors being substantially half the lateral dimension of said tread board of the second kind, and said arcuate outer peripheries of said sectors being formed with teeth so as to be in mesh with said first and second spur gear, respectively.

5. A moving staircase as claimed in claim 1, wherein each said upwards and downwards driving mechanism comprises a motor secured vertically to said longitudinal frame centrally thereof, a movable frame disposed above and spaced apart from said longitudinal frame in parallel thereto, a thread shaft integral with the output shaft of said motor and engaging a corresponding screw thread formed in a cylindrical engaging member secured to said movable frame on its under surface centrally thereof, a pair of horizontal shafts rotatably supported by said movable frame at its longitudinal ends so as to be perpendicular to the longitudinal axis of said movable frame and be in parallel with each other with a space being left from the upper surface of said movable frame, two pairs of sprocket wheels secured to said horizontal shafts such that two of said sprocket wheels are secured to each of said shafts at the same intervals so as to be symmetric with respect to the longitudinal center line of said movable frame, whereby each of said sprocket wheels secured to one of said shafts is longitudinally aligned with a corresponding sprocket wheel on the other of said shafts, an endless driving belt composed of three-row roller chains with the outer ones being respectively reeved on said longitudinally-aligned sprocket wheels, an electric motor to drive one of said horizontal shafts, and a support member to elastically support the load run of said driving belt disposed between the upper and lower runs thereof and elastically supported on said movable frame, whereby the middle row of said three-row endless chain is adapted to engage said sprocket wheels of said forward and rearward mechanism.

6. A moving staircase as claimed in claim 5, wherein first and second detecting means are provided between said horizontal frame and said movable frame to control the upward and downward movement of said upwards and downwards driving mechanism, and a third detecting means is associated with said electric motor to control its operation.

7. A moving staircase as claimed in claim 1, wherein a blocking mechanism is provided to block the operation of said forward and rearward mechanism.

8. A moving staircase as claimed in claim 3, wherein said fork means are a pair of spaced parallel straight rod-like bars arranged symmetrically with respect to the longitudinal center line of said load run and shiftably mounted to said tread board of the second kind on its under surface, and are adapted to be protruded into the holes correspondingly formed in two engaging members secured to said movable footboard so as to be transverse the longitudinal direction of said load run at intervals.

* * * * *